US011756035B2

(12) United States Patent
Brodsky et al.

(10) Patent No.: US 11,756,035 B2

(45) Date of Patent: Sep. 12, 2023

(54) SYSTEMS FOR DYNAMIC LOCATION-BASED ACCOUNT UPDATES

(71) Applicant: Capital One Services, LLC, McLean, VA (US)

(72) Inventors: Sara Rose Brodsky, New York, NY (US); Abhay Donthi, Cary, NC (US); Joshua Edwards, Philadelphia, PA (US); Jennifer Kwok, New York, NY (US); Tania Cruz Morales, Washington, DC (US); Jason Zwierzynski, Chapel Hill, NC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/511,602

(22) Filed: Oct. 27, 2021

(65) Prior Publication Data

US 2023/0128845 A1 Apr. 27, 2023

(51) Int. Cl.

*G06Q 40/00* (2023.01)

*G06Q 20/40* (2012.01)

(Continued)

(52) U.S. Cl.

CPC ......... *G06Q 20/4014* (2013.01); *G06Q 20/20* (2013.01); *G06Q 20/229* (2020.05)

(58) Field of Classification Search

CPC ............................ G06Q 30/06; G06Q 20/343

See application file for complete search history.

(56) References Cited

U.S. PATENT DOCUMENTS 6,123,259 A * 9/2000 Ogasawara ........ G06Q 30/0267 705/14.1

2008/0110978 A1* 5/2008 Blume ................ G06Q 20/403 235/380

(Continued)

FOREIGN PATENT DOCUMENTS

EP 661654 A2 * 7/1995 ............ G06Q 20/04

OTHER PUBLICATIONS

Du, Yongping (A Geographical Location Prediction Method Based on Continuous Time Series Markov Model, Journal of Interactive Marketing 23 (2009); https://journals.plos.org/plosone/article?id=10.1371/journal.pone.0207063, Nov. 19, 2018) (Year: 2018).*

(Continued)

*Primary Examiner* — Elizabeth H Rosen

*Assistant Examiner* — Mark H Gaw

(74) *Attorney, Agent, or Firm* — TROUTMAN PEPPER HAMILTON SANDERS LLP; Christopher J. Forstner; John A. Morrissett

(57) ABSTRACT

Systems and methods for confirming and/or updating account information are disclosed. The systems and methods may calculate relocation scores based on transaction data and device location data. The relocation scores may be based on locations of the transactions and/or locations of a user device beyond a registered customer address. A relocation score can be calculated based on a quantity of transactions having transaction locations beyond a first predetermined distance from the customer address as determined by transaction location identifiers. A relocation score can be calculated based on an elapsed duration of time since a customer transaction was completed within the first predetermined distance from the customer address.

20 Claims, 8 Drawing Sheets

100

TRANSACTION SYSTEM 104

PoS 130

MEMORY 134

OS 136

140

COMM'N INTERFACE 142

Transceiver 144

PROCESSOR 132

PROGRAM 138

102

LOCAL NETWORK 108

BACKEND SYSTEM 106

PROCESSOR 112

MEMORY 114

OS 116

120

COMM'N INTERFACE 122

IMAGE CAPTURE 150

PROGRAM 118

Transceiver 124

(51) Int. Cl.
*G06Q 20/20* (2012.01)
*G06Q 20/22* (2012.01)

(56) References Cited

U.S. PATENT DOCUMENTS

2011/0306359 A1* 12/2011 Alizadeh-Shabdiz ...................... G01S 5/0278 455/456.1
2012/0191614 A1* 7/2012 Babitch .................. G06Q 30/06 705/44
2013/0080280 A1* 3/2013 Scipioni ................. G06Q 50/12 705/26.1
2017/0228732 A1* 8/2017 Badenhorst ........... H04W 12/30

OTHER PUBLICATIONS

International Search Report and Written Opinion in related PCT Application No. PCT/US2022/078684, datd Jan. 4, 2023.

* cited by examiner

| | EXAMPLES | EXAMPLE ACTION |
|---|---|---|
| RELOCATION LEVEL 1 (HIGHEST CONFIDENCE LEVEL) | Check received for balance payment including new address | Place billing on hold<br>and<br>Customer service call to client device |
| RELOCATION LEVEL 2 | Balance payment received from regional bank beyond predetermined distance from client address | Customer service call to client device |
| RELOCATION LEVEL 3 | Card-present transactions over a predetermined time period and beyond a predetermined distance from client address | Customer service call to client device<br>or<br>Automated notification to client device |
| RELOCATION LEVEL 4 (LOWEST CONFIDENCE LEVEL) | User device beyond a predetermined distance from client address over a predetermined period of time | Automated notification to client device |

*FIG. 5*

SYSTEMS FOR DYNAMIC LOCATION-BASED ACCOUNT UPDATES

FIELD

The present disclosure relates generally to systems and methods for analyzing trends in customer data to identify if customers have moved and, more particularly, to systems and methods for dynamically confirming and/or updating accounts based on transaction and device location data.

BACKGROUND

Current and accurate customer account information is important in a customer/provider relationship. This is particularly true when the customer/provider relationship includes recurring services (e.g., for utilities, childcare, banking or credit cards, etc.) and, in turn, communications such as monthly bills and statements. On the customer side, current and accurate customer information, such as customer address, is important to ensure the customer is receiving all communications from the provider, including the monthly bills or statements. If the customer does not receive this information because it was mailed to the wrong address, there is a chance the customer may fall behind in payments or, in some scenarios, someone else may receive the communication, which may increase the potential for fraud. This problem is only exacerbated when the customer is not digitally engaged, for example those customers that rely on paper bills/statements mailed to their current mailing address.

On the provider side, current and accurate account information is important to protect the provider's interests, such as ensuring continued receipt of payments and avoiding liability and customer service concerns associated with potential fraud. Rather than automatically detecting when a customer has moved, existing systems tend to rely on manual procedures such as calling a customer if payment has not been received in a period of time, e.g., several months. However, with this and similar methods, contact is only made after the communication failure has occurred. These and other concerns exist.

BRIEF SUMMARY OF THE INVENTION

Examples of the present disclosure systems and methods for dynamically confirming and/or updating accounts based on transaction and device location data. The present disclosure provides a system for confirming and/or updating account information. The system can be used to determine if a user has potentially moved from their registered customer address and thus may be missing critical mailing communications. The system may calculate relocation scores based on transaction data and device location data. For example, a system can store customer account information including a customer address, and receive transaction data associated with a plurality of customer transactions and containing location identifiers. Alternatively or additionally, the system may receive device location data associated with a customer device (e.g., using a geographic location sensor on the customer device). Using the transaction location identifiers and/or the device location data, the system can calculate a relocation score based on the device location data and the transaction data. If the relocation score is determined to be over a predetermined value, the system can transmit a notification to the user device seeking confirmation of the account information.

Various factors for calculating the relocation score are provided. These factors can include determining how long transactions are outside of a predetermined distance from the customer address (e.g., a radius from the known address). The factors can also include whether payments made to an account (e.g., payments made to cover a credit card statement) are made by a financial institution that is not present within the region of the registered customer address. Various other example factors are provided herein.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner In the drawings:

FIG. 5 is an example algorithm for determining a relocation score, according to the present disclosure;

DETAILED DESCRIPTION

Examples of the present disclosure generally relate to systems and methods for analyzing trends in customer data to identify if customers have moved and, more particularly, to systems and methods for dynamically confirming and/or updating accounts based on transaction and device location data. The systems and methods described herein are necessarily rooted in computer technology as they relate to digitally tracking customer location based on digital payment locations (e.g., point of sale (PoS) locations in card-present transactions or internet protocol (IP) addresses in card-not-present transactions) and device locations. This type of location-based technology is facilitated by and relies on the use of the digital payment and tracking systems described herein.

Maintaining accurate account information for customers, including customer address, is an important function for both providers and customers alike. Throughout this disclosure, examples are provided in the context of financial institutions, such as banks and/or credit card providers. However, the interest in maintaining accurate account information is not limited to financial institutions—and the systems and methods herein can apply to other settings. However, one aspect of the present disclosure provides the ability to identify where transactions are occurring, e.g., via PoS device location, IP addresses, etc. For these examples, the systems and methods are well-suited for the financial institutions to analyze trends in customer data.

Throughout this disclosure reference is made to a "relocation score." It will be understood that the score can be understood as a certainty and/or confidence level for whether a customer has changed addresses. Examples are provided in which a stakeholder (like a financial institution) can adjust the relocation score according to personalized inputs—e.g., types of purchases made, how far the purchases are made from a known customer address, etc. However, it will also be understood that the bounds of the relocation score can be adjusted based on need—with different types of data getting more weight than other types of data. To illustrate, it may be that a particular stakeholder finds card-not-present transactions to be the most indicative of a customer moving, instead of card-present transactions. In those cases, the stakeholder can tailor those indicators to adjust the relocation score the most.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

Figure 1:
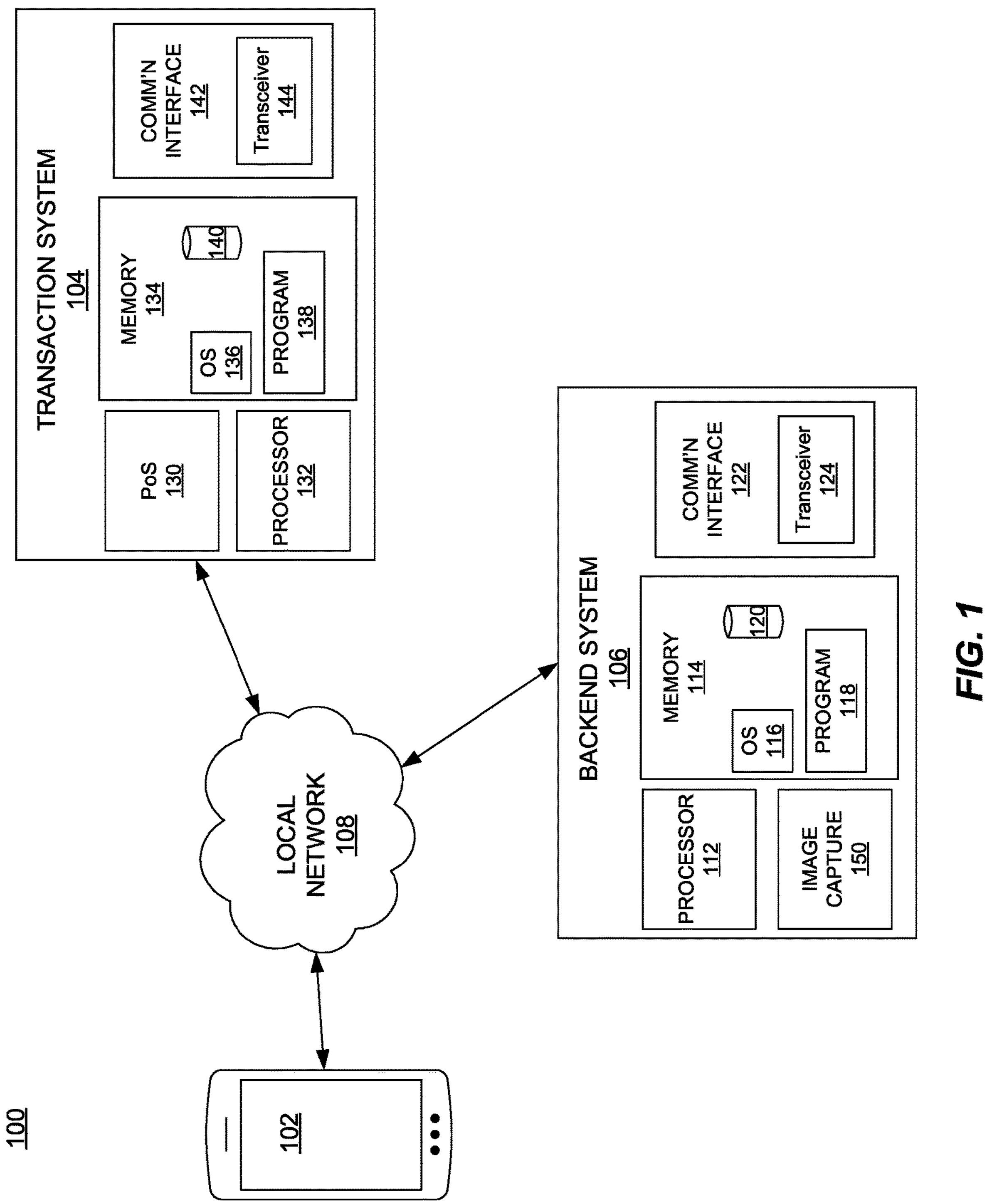
FIG. 1 is a diagram of an example system that can be used to implement one or more examples of the present disclosure.

FIG. 1 is a diagram of an example system environment 100 that can be used to implement one or more examples of the present disclosure. A more detailed explanation of the components of the system environment 100 is provided below. It is beneficial, however, to provide a brief overview to describe the components of the systems and methods for dynamically confirming and/or updating accounts based on transaction and device location data. The system environment 100 can include a backend system 106. The backend system 106 can be associated with the entity that stores customer account information, such as a financial institution. The backend system 106 can also store customer account information, billing information, transaction data, etc. The backend system 106 can be positioned communicatively between a transaction system 104 and a device 102, such as a user device of a customer with an account with the financial institution. The backend system 106 can receive transaction requests from a transaction system 104, track user location information on the device 102, and the like.

The system environment 100 can also include a transaction system 104. The transaction system 104 can be associated with a goods or services provider. The transaction system 104 can communicate with the backend system 106 so as to transmit payment requests from a customer regarding an intended purchase. The transaction system 104 can be associated with brick and mortar stores, such that transactions include card-present transactions; and/or the transaction system 104 can be associated with digital retailers, such that transactions include card-not-present transactions. In some examples, the transaction system 104 can be communicably coupled with a point of sale (PoS) device, as will be described in greater detail herein.

The backend system 106, transaction system 104, and device 102 can communicate with each other over a wired or wireless network 108. The network 108 can, therefore, facilitate a transaction being made via the transaction system 104 by a user using a card, by a user making an online purchase, and the like. The network 108 can facilitate the payment requests that are sent to the backend system 106 to initiate payment to the transaction system 104. The network 108 can also facilitate information sharing between the device 102 and the backend system 106. For example, as will be described in greater detail below, the user device can operate a mobile application (e.g., mobile application 250) that is associated with the backend system 106 (i.e., with the financial institution that operates the backend system). The backend system 106 can utilize the mobile application 250 to locate where the device 102 over certain periods of times to help determine if the device 102 is regularly or consistently outside of a predetermined distance from the known customer address.

The system environment 100 shown in FIG. 1 can form a system inclusive of the backend system 106, transaction system 104, and user device 102, or at least some or all of the components of the backend system 106, transaction system 104, and user device 102. For example, in certain embodiments described herein, the backend system 106 can rely upon operating systems and/or native mobile applications (e.g., mobile application 250) operating on the device 102 to track movement of the user via the location services provided by the device 102. The device 102, in turn, can include a geographic location sensor ("GLS") 214 for determining the geographic location of the device 102, including for example global positioning system (GPS) tracking sensor(s), cellular tracking sensor(s), and the like. The use of the backend system 106 hardware/software in tandem with the device 102 hardware/software can therefore provide the location tracking capabilities of the present systems and methods. In addition, the transaction system 104 can include hardware/software that enables each transaction made by a financial institution customer to be tracked—be it via PoS device location tracking and/or IP address location tracking. The use of the backend system 106 hardware/software in tandem with the transaction system 104 hardware/software can therefore provide additional location tracking capabilities to the present systems and methods.

Figure 2:
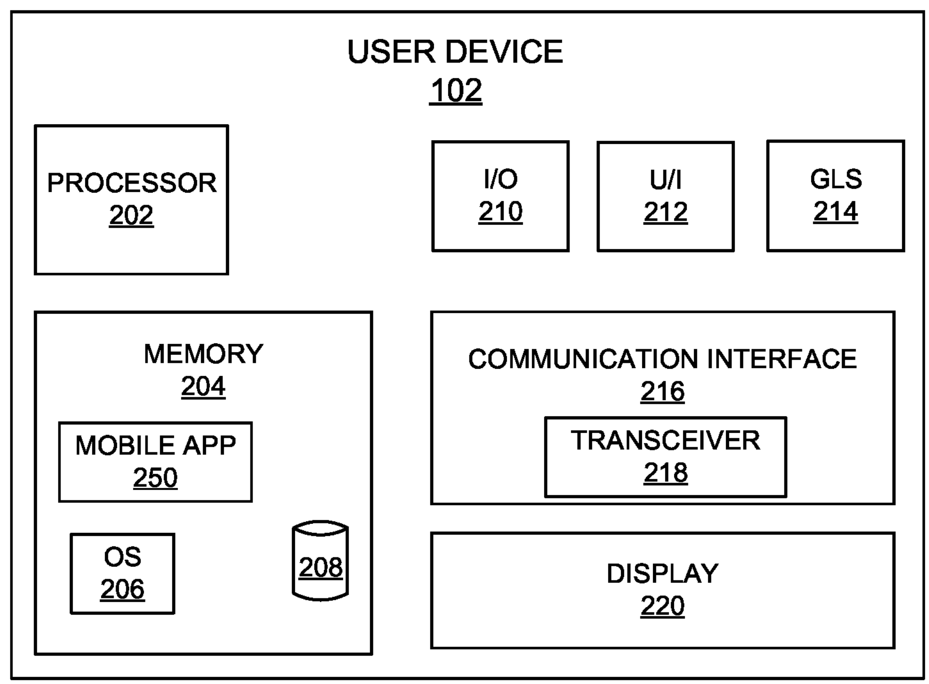
FIG. 2 is a component diagram of an example user device, according to the present disclosure.

FIG. 2 is a component diagram of an example device 102, according to the present disclosure. The device 102 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). The device 102 can include a processor 202 and a memory 204, operating system ("OS") 206, one or more programs (e.g., mobile application 250 described below), and/or data storage 208. The device 102 can also include a communication interface 216 that includes a transceiver 218. The communication interface 216 and/or transceiver 218 can be used to transmit and/or receive the data described throughout this disclosure, including for example the short-range wireless connections, payment tokens, transaction location data, etc.

The device 102 can also include one or more input/output ("I/O") devices 210 that can include one or more interfaces for receiving signals or input from devices and providing signals or output to one or more devices that allow data to be received and/or transmitted by the device 102. For example, the device 102 can include interface components, which can provide interfaces to one or more input devices, such as one or more keyboards, mouse devices, touch screens, track pads, trackballs, scroll wheels, digital cameras, microphones, sensors, and the like, that allow the device 102 to receive data from one or more users.

The device 102 can also include a user interface ("U/I") device 212 for receiving user input data, such as data representative of a click, a scroll, a tap, a press, or typing on an input device that can detect tactile inputs. According to some examples, U/I device 212 can include some or all of the components described with respect to I/O device 210 above. The U/I device 212 can be defined as the "input" of the device 102. The device 102 can also include a GLS 214 for determining the geographic location of the device 102, including by using GPS data and cellular data, as described above.

The device 102 can include a display 220. The display 220 can provide visual representation of the applications (e.g., mobile application 250) and/or graphical user interfaces (GUIs) associated with those applications. The display 220 can also be a U/I device 212 in the case that the device 102 has touchscreen capabilities. In other words, in some examples the display 220 can be the "input" of the device 102.

Figure 3:
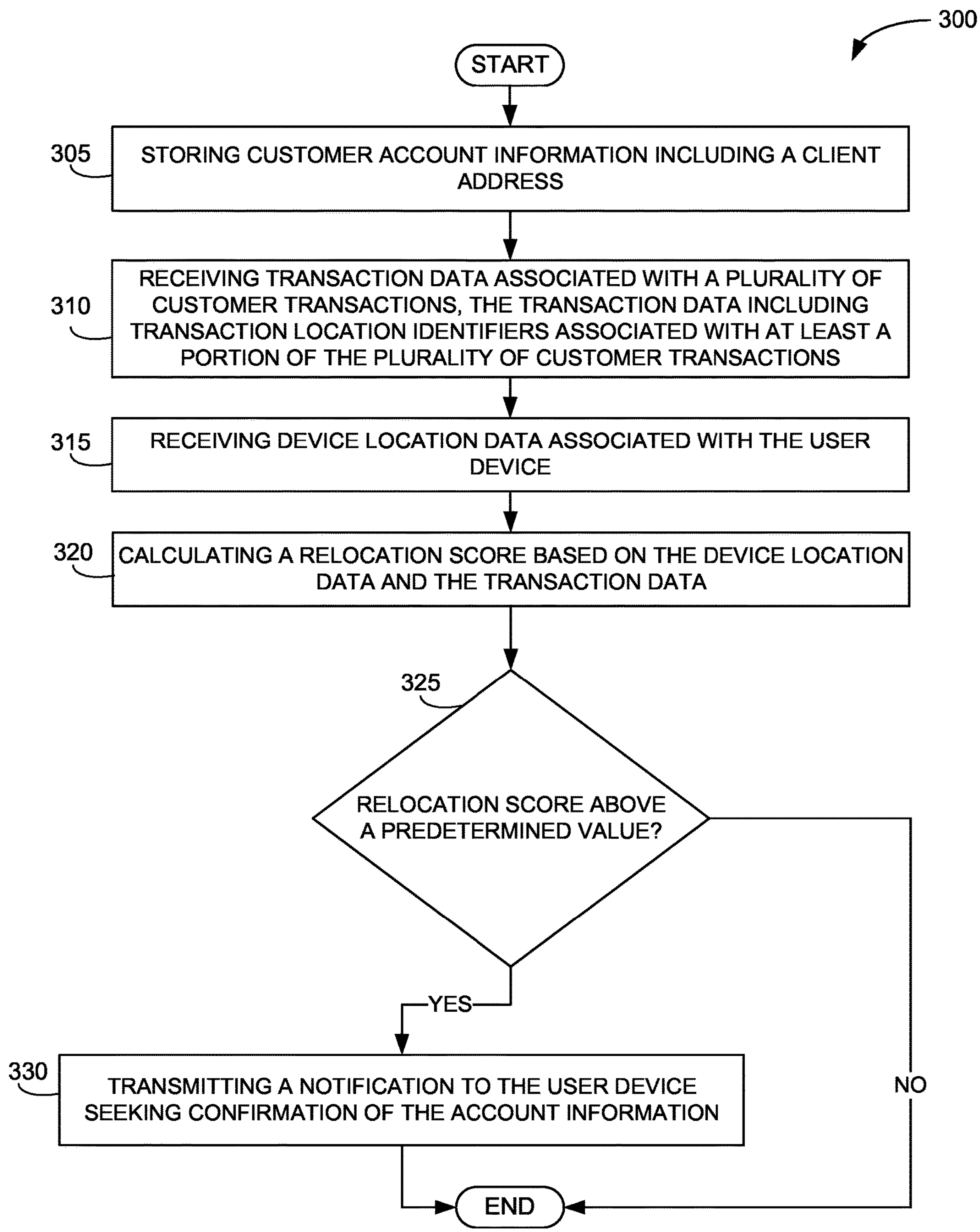
FIG. 3 is a flowchart of an example process for confirming and/or updating account information, according to the present disclosure.

FIG. 3 is a flowchart of an example process 300 for confirming and/or updating account information, according to the present disclosure. Process 300 can be performed in whole or in part by the components of the backend system 106, for example a processor 112, memory 114, and instructions (e.g., OS 116 and program 118) described below. Process 300 can begin with storing 305, in a database associated with the system (e.g., database 120), customer account information including a customer address. The customer address can be stored for the account when the customer sets up their account (e.g., backing account, credit card account, etc.). The customer address can be revised by accessing the account via the backend system 106 and changing the account. In many cases, however, customer may forget to make changes to addresses when they move. The present systems and methods, therefore, enable the backend system 106 to determine if the user has inadvertently forgotten to change addresses after a move so that bills/statements can be rerouted to a different address.

Process 300 can include receiving 310 transaction data associated with a plurality of customer transactions. The transaction data can be received from a variety of sources. In one example, the transaction data can be received from a transaction system (e.g., transaction system 104) via a PoS device (e.g., PoS device 130) associated with or in communication with the transaction system 104. For example, the PoS can be an electronic fund transfer terminal that accepts payments via a credit card via a magnetic stripe and/or via contactless payment. In some examples, the transaction data can be received from the transaction system 104 via a computing device owned by the account holder (e.g., device 102). For example, when a user is purchasing a product/service from an online retailer via the internet and/or a mobile application, the transaction system 104 processing can transmit that purchase information to the backend system 106.

The transaction data described in the receiving 310 step can include transaction location identifiers associated with at least a portion of the plurality of customer transactions. These location identifiers can be retrieved along with the transaction from the transaction system 104. In the context of card present transactions, the transaction location identifiers can be received in view of the location of the PoS device. PoS devices are registered to a company, and the transfer of funds is financial institution-to-financial institution. Therefore, the transaction information includes certain information, including but not limited to date, time, transaction number, and transfer location—which includes the location of the PoS device when the card-in-hard transaction was made. In the context of online purchases, the transaction location identifiers can be found via identifying the IP address of the device that made the purchase. In these scenarios, the financial institution operating the backend system 106 can have a negotiated partnership with online retailers such that the financial intuition can receive information about the IP address of the purchaser.

In other examples, the IP address can also be received if a "virtual number" is used for the transaction. A virtual number, or a virtual card number, is a process/system to make a purchase online without using a bank card number. Instead of using the bank card number, the financial institution can provide a merchant-specific virtual number that is mapped to a bank account and that can only be used at that bound merchant Using the virtual number can provide information on where the transaction was made (i.e., via the IP address). To illustrate, the backend system 106 can know the IP address of the device that created the virtual number. A user device (e.g., device 102) can, for example, include a browser extension that can communicate with the mobile application 250 and/or OS 206 of the device 102. The browser extension can be activated when a checkout page is accessed on the device 102. The browser extension can ask the customer if they wish to create a virtual number. If the customer agrees, the browser extension can interact with the backend system 106 to create the virtual number. The device 102 can receive the virtual number, and the virtual number can be displayed in the browser extension. In a checkout page, the customer can enter the virtual number into the checkout fields and confirm purchase. The backend system 106 can store the IP address of the device that created the virtual number, and the backend system 106 can store which merchant is bound to the virtual number. This use of the virtual number can serve as a proxy for the IP where the customer made the purchase.

In some examples, process 300 can include receiving 315 device (e.g., device 102) location data associated with the device 102. The backend system 106, for example, can use a mobile application (e.g., mobile application 250) operating on the phone to locate where the phone has been located over a predetermined period of time. As will be appreciated, location services on a device 102 can be employed to periodically ping a device to identify customer movement/location.

Process 300 can include calculating 320 a relocation score based on the transaction data and/or device location data. Example parameters that can be used to calculate a relocation score are found in FIGS. 4A-4D. However, to briefly summarize, the relocation score can be based on (1) a quantity of transactions of the plurality of customer transaction having transaction locations beyond a first predetermined distance from the customer address as determined by the transaction location identifiers, and/or (2) an elapsed duration of time since a customer transaction of the plurality of customer transactions was completed within the first predetermined distance from the customer address. For parameter (1) above, the location of the transactions can be used to determine if there is a likelihood the customer moved and thus is potentially not receiving statements. As will be described in greater detail below with reference to FIG. 4A, this location can be based on where the customer "typically" is located—i.e., the registered customer address. For example, if the customer has a registered address in New York City, the first predetermined distance from the customer address that may increase the relocation score may be relatively small—15 miles for example. This is because ordinary movement for this particular customer may be restricted to the New York City area and a 15 mile radius from their current address is a significant distance. However, if the customer has a customer address in rural Tennessee, the first predetermined distance that raises concerns about potential moving can be larger—50 miles for example. In some examples, the distance can be scaled based on customer transactions over a period of time. For example, if a user makes all purchases over a six-month period within a 63-mile radius from home, the first predetermined distance can be 63 miles until it is updated after another six months. For parameter (2) above, the elapsed duration of time since a customer transaction was completed within the first predetermined distance can act as a "reset" that shows the customer may not have moved. For example, if a customer makes purchases outside of the first predetermined distance consistently for three months, without any "resets" where a transaction was completed within the first predetermined distance, the likelihood of relocation can be higher, thus a higher relocation score. However, if the customer also completed a purchase within that first predetermined distance a few times within those three months, it could be that the customer was merely traveling. The same type of scoring described in parameters (1) and (2) can be performed using the device location information. It will also be appreciated that the relocation score can be determined based on either the transaction data, the relocation data, or both.

Process 300 can include determining 325 if the relocation score is above a predetermined value. The predetermined value can be set based on preferences set by the financial institution. If the relocation score is below the predetermined value, process 300 can end. If the relocation score is above the predetermined value, process 300 can include transmitting 330, for example via transceiver 124, a notification to the user device seeking confirmation of the account information. This notification can be any number of notifications, including automatic push notifications, automatic text (e.g., SMS) messages, automatic emails, automatic calls, and/or personalized calls from a customer service representative. Further, remedial actions can be performed. Examples of the notifications and remedial measures are provided in the description with respect to FIG. 5. Process 300 can end after the transmitting 330 step or any other processes described herein can be completed.

Figure 4A:
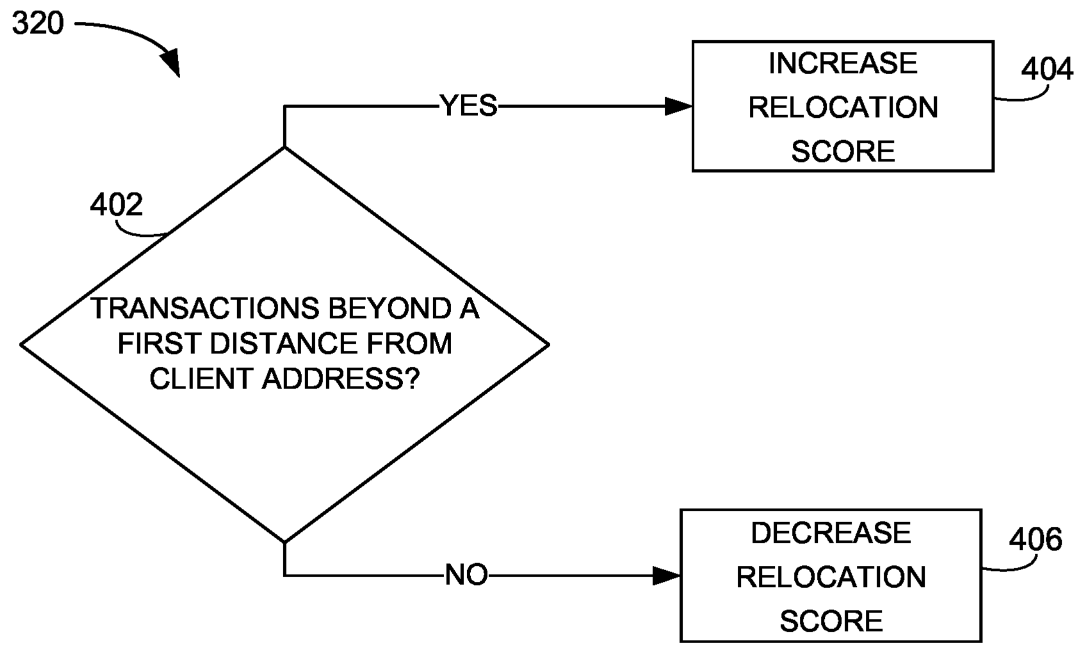
FIGS. 4A-4D depict factors that can be used in determining a relocation score, according to the present disclosure.

FIGS. 4A-4D depict factors that can be used in determining a relocation score, according to the present disclosure. As indicated in each of FIGS. 4A-4D, these factors can form all or a portion of the calculating 320 step described in process 300 of FIG. 3. Referring to FIG. 4A, the system (e.g., backend system 106 and/or a processor associated with the backend system 106 such as processor 112) can receive transaction location information, as described above, for a plurality of transactions. These transactions can be performed, for example, at a PoS device and/or on a device (e.g., device 102). The backend system 106 can then determine 402 if these transactions have occurred beyond a first distance from the registered customer address. If the transaction data indicates that the transactions were completed outside of the first distance, the system can increase 404 the relocation score; if no transactions were completed outside of the first distance, the system can decrease 406 the relocation score or leave the score the same. As stated above, the distance (e.g., radius) can be set based on the type of location of the registered customer address—urban registered addresses can have a shorter distance to trigger increasing the relocation score, while rural registered addresses can have a longer distance to trigger increasing the relocation score.

Further, the determining 402 step in FIG. 4A can be based on transactions over a certain period of time. For example, if transactions occur outside of the distance over the course of two weeks or even one month, this may not be sufficient to trigger increasing the relocation score, since it may be that the customer was merely travelling. The financial institution can therefore set a time period in which to track the distant transactions, e.g., two months, three months, etc. Further, the time period in which to track the distant transactions can also be tailored based on customer information related to, for example, job title or job description. The financial institution can query the customer (e.g., via mobile application 250) about what type of jobs the customer holds. If the customer is a consultant, pilot, long-haul truck driver, etc., the time period to trigger increasing the relocation score can be scaled longer. Further, if it is determined that the customer is active military, the duration of time can be increased and/or the relocation score calculation can be paused completely when the customer is deployed. It can be possible for the financial institution to receive and retain this type of information in accordance with compliance with their Servicemembers Civil Relief Act (SCRA) duties.

Figure 4B:
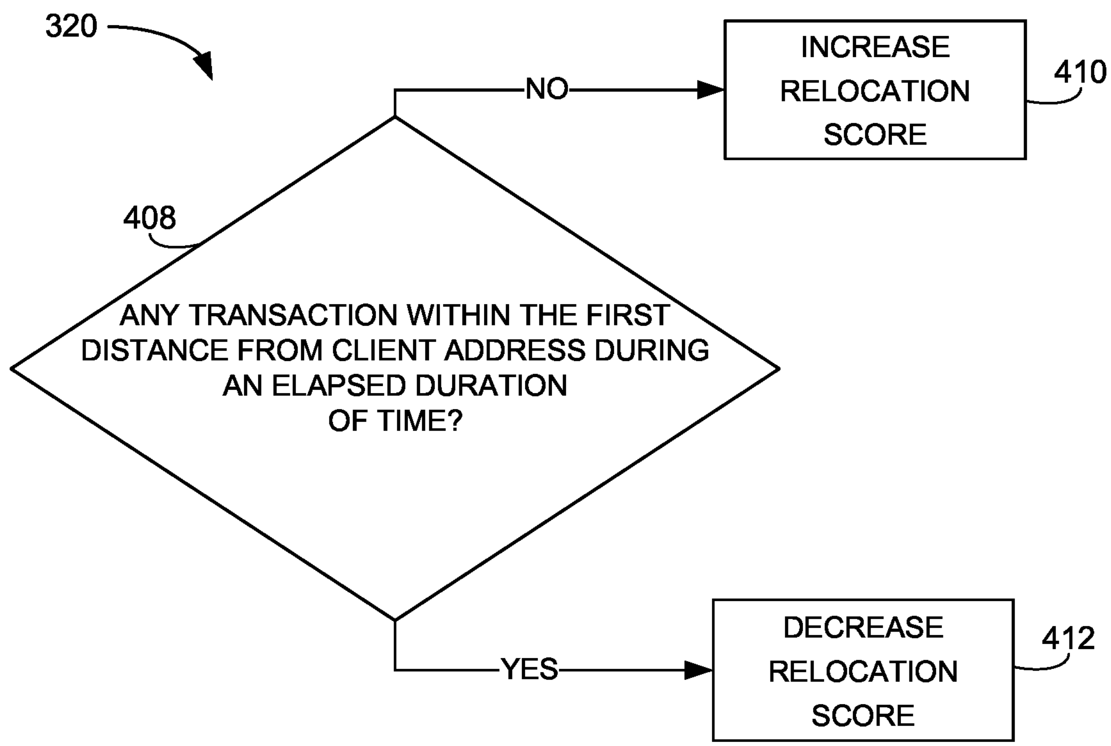

Referring to FIG. 4B, the system (e.g., backend system 106 and/or a processor associated with the backend system 106 such as processor 112) can determine 408 if any transaction of the plurality of transaction from FIG. 4A was made within the distance from the customer address within an elapsed period of time. If one (or more) transactions were made within that distance (radius) during the elapsed period of time, the system can decrease 412 the relocation score; if no transactions were within that distance (radius) during the elapsed period of time, the system can increase 410 the relocation score. Again, this determining 408 step can be used to "reset" the certainty that the user may have a different mailing address because the customer transacted closer to home. This can indicate, for example, that the customer was merely traveling when the plurality of transactions outside of the first distance were made. To illustrate, if the user completes 1000 transactions outside of the predetermined distance over the course of three months, but completes 5 transactions inside the predetermined distance during that time, the relocation score can be decreased 412 or, in some examples, reset to zero (e.g., zero certainty that the customer moved).

Figure 4C:
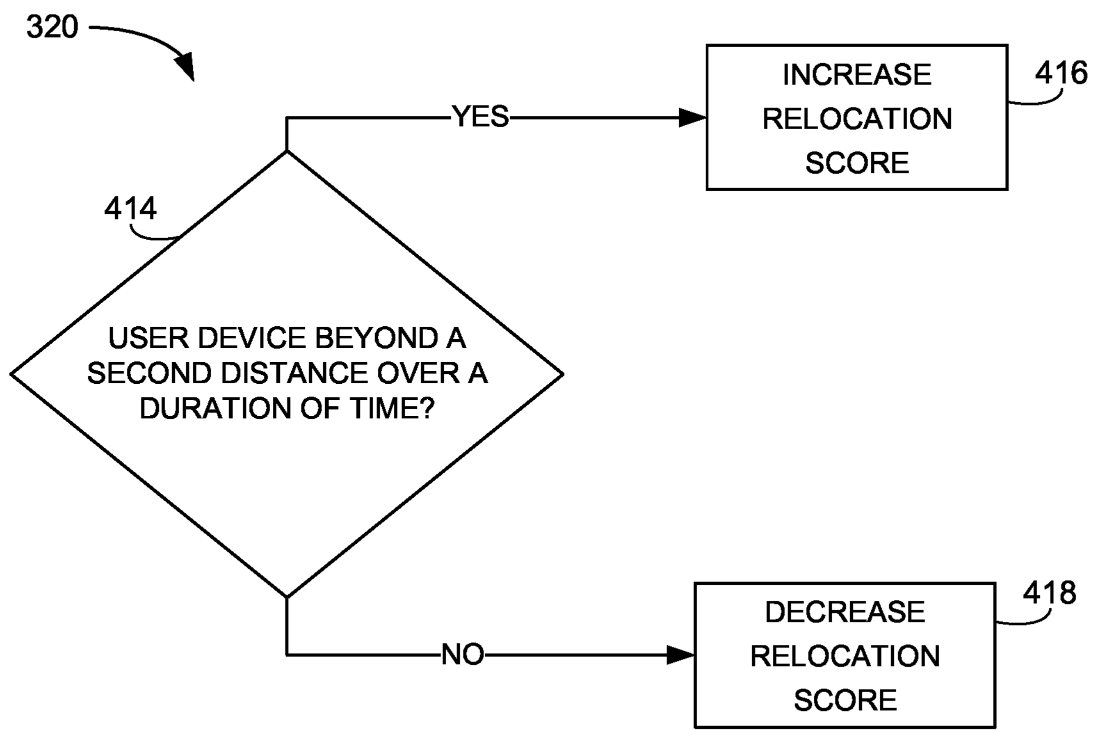

Referring to FIG. 4C, the system (e.g., backend system 106 and/or a processor associated with the backend system 106 such as processor 112) can determine 414 if a user device (e.g., device 102) is beyond a second distance from the customer address over a duration of time. This "system" of tracking the device can include both the backend system 106 and the device 102. If the device is outside of the second distance for a duration of time, the system can increase 416 the relocation score; if the device does not go outside the second distance for the duration of time, the system can decrease 418 the relocation score. The system can, as described above, use the location services (e.g., GLS 214) of the device 102 to track the device location. In these examples, if the device is outside of the second distance for two months, three months, etc. without re-entering the second distance (e.g., radius), the relocation score can be increased. If the device re-enters the second distance, the relocation score can be decreased or, in some examples, reset to zero (e.g., zero certainty that the customer moved). It is contemplated that the second distance described in FIG. 4C is the same as the first distance described in FIG. 4A; though the second and first distance can also be different distances. By having a second distance (based on device location) that is different than the first distance, the backend system 106 can give more tolerance to people who travel often during the day but do not make purchases/significant purchases, e.g., a larger radius can be applied to device location data.

Figure 4D:
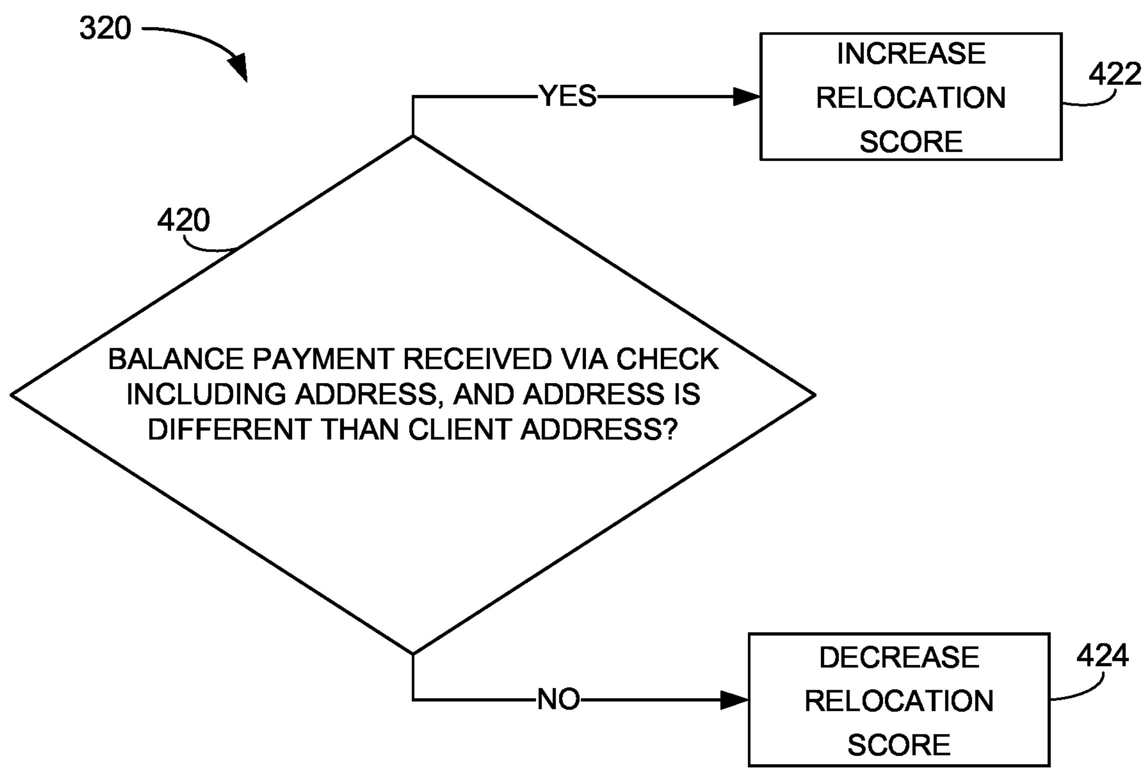

Referring to FIG. 4D, the system (e.g., backend system 106 and/or a processor associated with the backend system 106 such as processor 112) can determine 420 if a balance payment for an account associated with the customer is received via a check; if the address is different than the customer address, the relocation score can be adjusted. As will be appreciated, paper checks include identifying information such as name and address. The system can use optical character recognition (OCR) on any check received, compare the name and address on the check with customer address information associated with the account which is being billed, and determine if the addresses match. If the address is different than the customer address, the system can increase 422 the relocation score; if the address is the same, the system can decrease the relocation score 424. To complete the OCR, the backend system 106 can include or be in communication with an image capture device 150, which can be a camera, scanner, and the like capable of capturing and/or scanning the image of the check.

Another, similar example of using image-recognition to identify whether the relocation score should be increased or decreased is to scan, capture, and/or examine the envelope in which the check payment was returned to the financial institution. If the balance check was returned to the customer within an envelope provided in the mailed, paper statement, this is indicative of the customer receiving the paper balance statements, and therefore is evidence that the customer has not moved—the relocation score can be lowered. This information can be captured by OCR, as described above. In some examples, the return envelope can include an identifying marker, such as a barcode, quick response (QR) code, alphanumeric code, and the like that can be scanned to indicate whether the customer returned the check in the provided envelope.

In an additional or an alternative embodiment, the backend system 106 can determine whether the relocation score should be increased or decreased based on the value of the check. For example, if a balance on the account is $125.36, and a check is returned to the financial institution with a value of $125.36, this can be indicative of the user receiving the paper balance statement and sending a check. This example can be particularly valuable for customers that are not digitally enrolled. For example the backend system 106 can store information indicative of whether the customer (a) is actively enrolled in digital account management systems associated with financial institution and/or (b) has accessed their digital account management system since a prior statement period. If the customer is not digitally enrolled, or if the customer has not accessed their digital account since the last statement, an indication that the customer paid the correct balance is evidence that the customer has not moved—and the relocation score can be lowered. The value of the check can be scanned via the image capture device 150, as described above.

FIGS. 4A-4D depict example parameters/factors that can be used in determining a relocation score, but the examples are not exhaustive or limiting. Other factors can be used. For example, in some embodiments the system can analyze the type of good or service being purchased by the customer to increase or decrease the relocation score. The transaction information received from the transaction system 104 can include a plurality of categories associated with the at least a portion of the plurality of customer transactions. These categories can be determined based on merchant category codes for the merchant operating the transaction system 104. Merchant category codes can be used to determine if a customer is purchasing groceries, hardware, car rentals, etc. The type of category can be indicative of whether a customer has moved. For example, if the plurality of transactions over a predetermined period of time include a car rental, this can be indicative that the customer has not moved but is merely outside of the predetermined distance for work, travel, etc.—and the relocation score can be decreased or can remain static. If the plurality of transactions include hardware transactions, however, this can indicate that the customer has moved into a new home—and the relocation score can be increased.

Other factors that can be used to increase or decrease the relocation score can include what type of financial institution is being used to make a statement payment. For example, in the case of a credit card statement, a user typically pays the statement via a checking account. If the financial institution associated with that checking account changes over time, that can be indicative of the customer moving. To illustrate using an example, the customer may have an address in Georgia, and the customer typically pays her credit card statement with a checking account at Bank A, which has a southeastern U.S. footprint when it comes to branch locations. If one month the customer makes a payment with a checking account at Bank B, that does not have a southeastern footprint but only a midwestern footprint, this can indicate that the customer has moved, and her relocation score can be increased.

FIG. 5 is an example algorithm for determining a relocation score, according to the present disclosure. Any of the factors described in FIGS. 4A-4D, or any other factor as described herein or otherwise, can be used alone to determine a relocation score, or multiple factors can be used to provide a sliding scale of relocation score and/or remedial action based on the relocation score, as illustrated in FIG. 5. For example, a Relocation Level 1 (or highest level) of a relocation score confidence level can be when a check is received for a balance payment that includes a new customer address. When this happens, the relocation score can be increased to a threshold that triggers a remedial action. These remedial actions can include placing a hold on the bill and having a customer service agent call the customer device registered to the customer. Billing can be placed on hold, for example, to ensure that no one besides the customer is receiving the paper bill—therefore decreasing chances of fraud.

Relocation Level 2 (or next highest level) of a relocation score confidence level can be when balance payment is received from a regional back that is beyond a predetermined distance from the customer address. This example was described above for when a bill payment is received from a checking account at a financial institution that does not have footprint within a predetermined distance of the registered customer address. The remedial actions for these situations can include having a customer service agent call the customer device. Relocation Level 3 (or next highest level) of a relocation score confidence level can be when card-present transactions occur over a predetermined time period and beyond a predetermined distance from customer address. Again, these situations can "reset" the score, or the relocation score can be lowered, if a transaction occurs within the distance within the predetermined time. When the score reaches a predetermined level, the remedial action can include a customer service call to the customer device or an automated notification to the customer device. The automated notification can be a SMS message, text message, push notification (e.g., to the mobile application 250), an automated call, email, etc. Relocation Level 4 (or the lowest level) of a relocation score confidence level can be when a user device (e.g., device 102) is beyond a predetermined distance from the customer address over a predetermined period of time. Unlike Relocation Level 3, which uses the transaction location data described herein, Relocation Level 4 uses the device location data. The remedial measure for this relocation level can be an automated notification, as described above. Certain remedial actions can include automatically updating a user address in the customer account if the relocation score is high enough. In some examples, a notification can be sent to the device 102 to confirm whether the address should be updated, and the system can automatically update the customer address in response to confirmation. In some examples, if the relocation score is sufficiently high, the backend system 106 can freeze the customer account so that no additional transaction can be made.

In some examples, the relocation scores can be tiered. For example, some embodiments of the present disclosure utilize both transaction location data as well as device location data. In these examples, a single customer may achieve a certain relocation score—say a 50% likelihood that the customer has moved based on transaction location data alone. This 50% relocation score may be sufficient to send a push notification if reached. If the system also tracks device location data, and the location of the device 102 is outside of a predetermined distance from the customer address, the location information can push the relocation score beyond the 50% mark. The backend system 106 can set a threshold, for example, of 50% in which to send personal communications to the customer (e.g., a customer service call).

In some examples, any and all factors that are used to calculate a relocation score can be altered and/or recalibrated based on feedback sent to the system. For example, a machine learning algorithm operated by the backend system 106 can be used to update the parameters of the individual factors used to calculate the score. Using the "card-present transactions over a predetermined period of time and beyond a predetermined distance from the client address" factor as an example, the backend system 106 can learn whether the predetermined parameters are sufficient to identify whether a customer has moved. To illustrate using a non-limited example, consider that the backend system determines that 100 customers in Urban Area A have moved based on a relocation score that uses a 50-mile distance (radius) parameter. After sending these 100 customers an automated notification to the client devices, the backend system 106 receive 80 indications back from the customers that they have not moved from their registered customer address. Using this information, the backend system 106 can re-train the machine learning algorithm to reset that the radius that triggers an increased relocation score to be 75 miles, so that the "false-positives" are decreased. In addition, the backend system 106 can train the machine learning algorithm to weight certain activities more heavily based on responses from users. For example, if it is determined that the "card-present transactions over a predetermined period of time and beyond a predetermined distance from the client address" factor is providing more false-positive of customers moving than "user device beyond a predetermined distance," the user device location data can be weighted more heavily for increasing the relocation score than the transaction location data. Further, information related to customer engagement with the notifications sent to the customer devices can help train the types of notifications sent. As described, the backend system 106 can have a relocation score threshold, for example 50% certainty, in which to send personal communications to the customer. If it is determined that customer interaction with automated notifications is low, the system can be trained to send personal communications to the customer at a lower relocation score.

Figure 6:
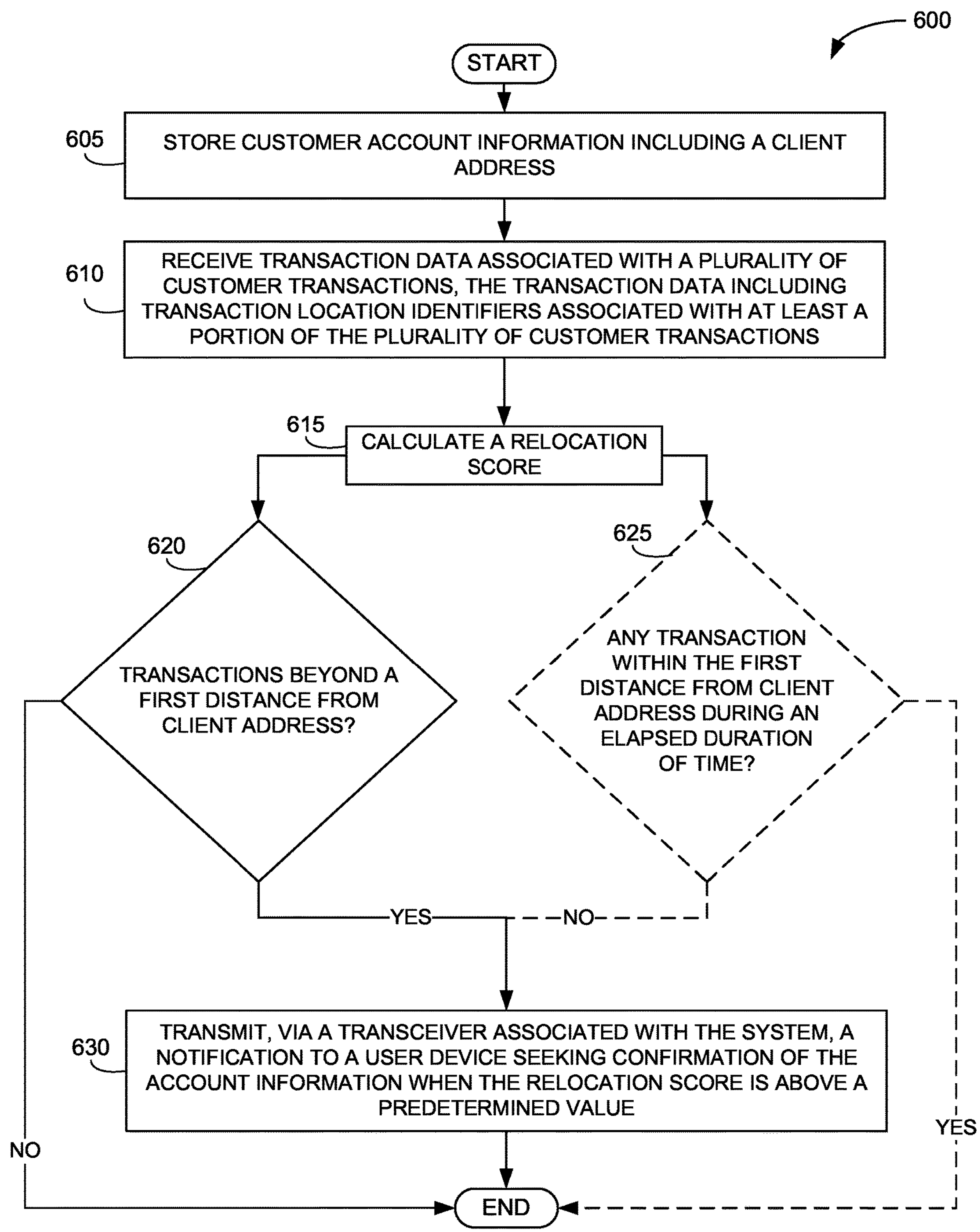
FIG. 6 is a flowchart of an example method for confirming and/or updating account information, according to the present disclosure.

FIG. 6 is a flowchart of an example method 600 for confirming and/or updating account information, according to the present disclosure. Method 600 can be performed in whole or in part by the components of the backend system 106, for example a processor 112, memory 114, and instructions (e.g., OS 116 and program 118) described below. Method 600 can begin with storing 605, in a database (e.g., database 120) associated with the system, customer account information including a customer address. Method 600 can include receiving 610, for example at a transceiver 124, transaction data associated with a plurality of customer transactions. The transaction data can include transaction location identifiers associated with at least a portion of the plurality of customer transactions.

The method 600 can include calculating 615 a relocation score. As described above, in some examples transaction location data can be used to calculate the relocation score, in some examples the device location data can be used, and in some examples both transaction location data and device location data can be used. In some examples, method 600 can include determining 620 if a quantity of transactions of the plurality of customer transaction are made beyond a first distance from the customer address. Method 600 can include determining 625 whether any transactions of the plurality of customer transactions are made within the first distance from the customer address during an elapsed period of time. If the system determines in step 620 that a certain quantity of transactions were made outside the distance (i.e., radius), and determines in step 625 that no transaction was made within the distance during the elapsed time period, method 600 can include transmitting 630, via the transceiver 124, a notification to a user device (e.g., device 102) seeking confirmation of the account information. Method 600 can end after step 630 or can include any other steps described herein.

Figure 7:
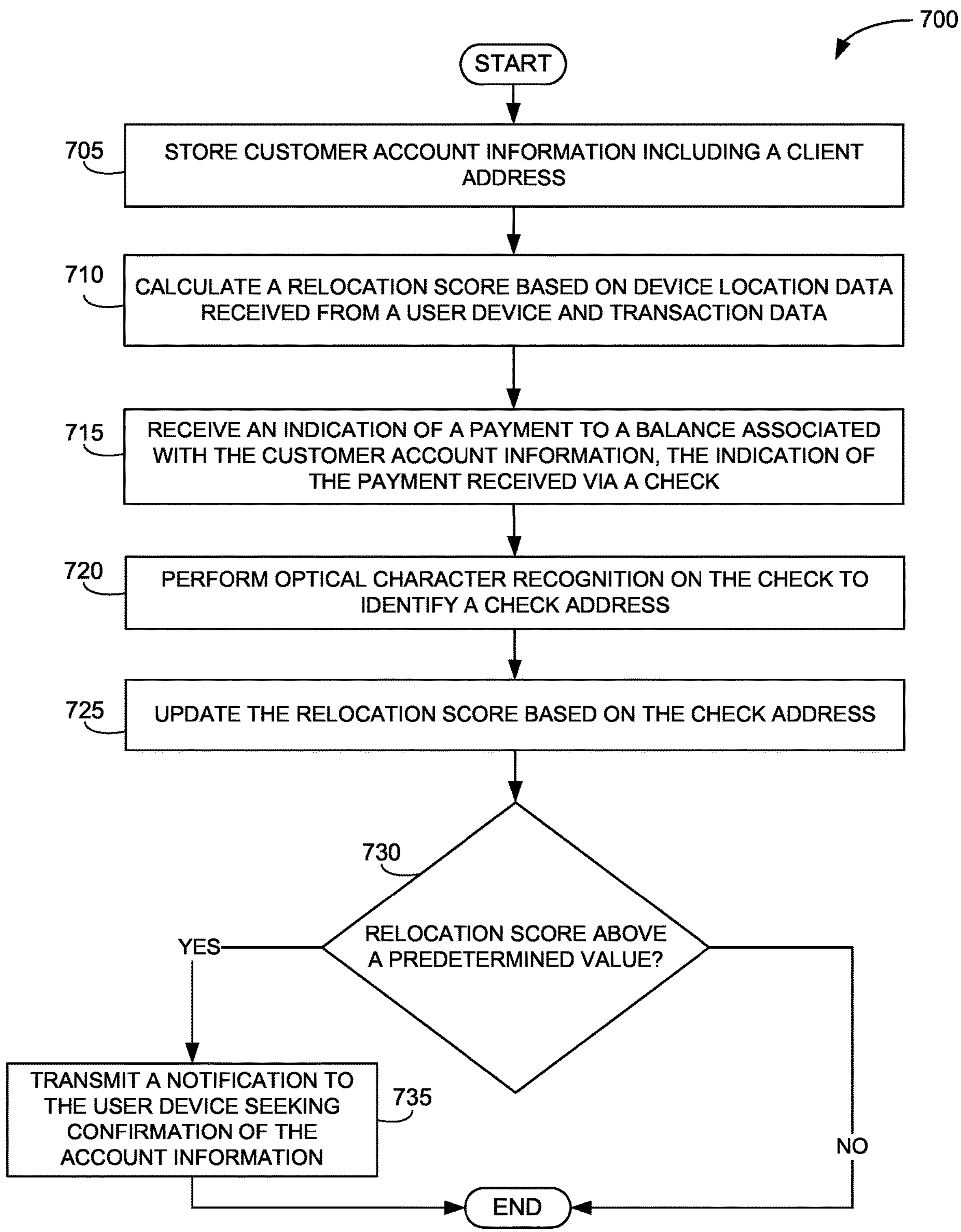
FIG. 7 is a process of an example process for confirming and/or updating account information, according to the present disclosure.

FIG. 7 is a process of an example process 700 for confirming and/or updating account information, according to the present disclosure. Process 700 can be performed in whole or in part by the components of the backend system 106, for example a processor 112, memory 114, and instructions (e.g., OS 116 and program 118) described below. Process 700 can begin with storing 705, in a database (e.g., database 120) associated with the one or more processors, customer account information including a customer address. Process 700 can include calculating 710, via the one or more processors, a relocation score based on device location data received from a user device and transaction data. Process 700 can include receiving 715, at the one or more processors, an indication of a payment to a balance associated with the customer account information. The indication of the payment can be received via a check. Process 700 can include performing 720, via the one or more processors, optical character recognition (OCR) on the check to identify a check address. Process 700 can include updating 725, via the one or more processors, the relocation score based on the check address.

After the relocation score is updated, the process 700 can include determining 730 whether the relocation score is above a predetermined value. If the score is below the value, process 700 can end. If the score is above the value, process 700 can include transmitting 735, via a transceiver associated with the one or more processors, a notification to the user device seeking confirmation of the account information when the relocation score is above a predetermined value. Other steps, such as the remedial actions described with reference to FIG. 5 can also be performed.

Referring again to the system environment 100 described in FIG. 1, the backend system 106 can include one or more processors 112, a memory 114, and data storage, for example in database 120. The processor 112 can include one or more of a microprocessor, microcontroller, digital signal processor, co-processor or the like or combinations thereof capable of executing stored instructions and operating upon stored data.

The memory 114 of the backend system 106 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

The memory 114 of the backend system 106 can contain an operating system ("OS") 116 that can run one or more programs 118. The one or more programs 118 can perform one or more functions of the disclosed examples. The one or more programs 118 can include, for example, a program for creating the mobile application 250 operable on the user devices (e.g., device 102).

The memory 114 can also include any combination of one or more databases, including for example database 120, controlled by memory controller devices (e.g., server(s), etc.) or software, such as document management systems, Microsoft® SQL databases, SharePoint® databases, Oracle® databases, Sybase® databases, or other relational databases.

The backend system 106 can include a communication interface 122 for communicating with external systems or internal systems. The communication interface 122 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface 122 can include a transceiver 124 to communicate with compatible devices. A transceiver 124 can be compatible with one or more of: RFID, NFC, Bluetooth™, low-energy Bluetooth™ (BLE), WiFi™, ZigBee™, ambient backscatter communications (ABC) protocols, or similar technologies that allows the backend system 106 to communicate via the network 110 described herein.

The transaction system 104 can include a processor 132, memory 134, an OS 136 operating one or more programs 138, a database 140, and a communication interface 142 comprising a transceiver 144, each of which can be similar to the processor 112, memory 114, an OS 116 operating one or more programs 118, a database 120, communication interface 122, and transceiver 124 described above for the backend system 106, respectively.

The transaction system 104 can include or be communicatively coupled to a PoS device 130. PoS device 130 can provide the interface at what a card holder makes a payment to the merchant in exchange for goods or services. PoS device 130 can include and/or cooperate with weighing scales, scanners, electronic and manual cash registers, electronic funds transfer at point of sale (EFTPOS) terminals, touch screens and any other wide variety of hardware and software available for use with PoS device 130. PoS device 130 may be a retail point of sale system and can include a cash register and/or cash register-like computer components to enable purchase transactions. PoS device 130 also can be a hospitality point of sale system and include computerized systems incorporating registers, computers and peripheral equipment, usually on a computer network to be used in brick and mortar retailer, restaurant, hair salons, hotels, or the like. PoS device 130 can be a wireless point of sale device, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 130 also can be a cloud-based point of sale system that can be deployed as software as a service, which can be accessed directly from the internet using, for example, an internet browser.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1. A system for confirming account information, comprising: one or more processors; and memory in communication with the one or more processors and storing instructions that, when executed by the one or more processors, are configured to cause the system to: store, in a database associated with the system, customer account information including a customer address; receive transaction data associated with a plurality of customer transactions, the transaction data including transaction location identifiers associated with at least a portion of the plurality of customer transactions; calculate a relocation score based on the transaction data, wherein the relocation score is based upon at least one of: a quantity of transactions of the plurality of customer transaction having transaction locations beyond a first predetermined distance from the customer address as determined by the transaction location identifiers; or an elapsed duration of time since a customer transaction of the plurality of customer transactions was completed within the first predetermined distance from the customer address; and transmit, via a transceiver associated with the system, a notification to a user device seeking confirmation of the account information when the relocation score is above a predetermined value.

Clause 2. The system of Clause 1, wherein the instructions are further configured to cause the system to receive, from a geographic location sensor on the user device, device location data associated with the user device, wherein the relocation score is further based on the device location data, and wherein the relocation score is based upon a duration of time the user device is beyond a second predetermined distance from the customer address.

Clause 3. The system of Clause 2, wherein the first predetermined distance and the second predetermined distance are the same distance.

Clause 4. The system of Clause 2, wherein the second predetermined distance weighted based upon a geographic location of at least one of the customer address or transaction locations.

Clause 5. The system of Clause 1, wherein the first predetermined distance is weighted based upon a geographic location of at least one of the customer address or the transaction locations.

Clause 6. The system of Clause 1, wherein the relocation score is further based on a plurality of categories associated with the at least a portion of the plurality of customer transactions, and wherein the plurality of categories is determined based on merchant category codes.

Clause 7. The system of Clause 1, wherein the transaction locations are based on locations of point of sale devices (PoS).

Clause 8. The system of Clause 1, wherein the transaction locations are based on Internet Protocol (IP) addresses associated with digital transactions completed using at least a portion of the customer account information.

Clause 9. The system of Clause 1, wherein the duration of time is greater than 60 days.

Clause 10. The system of Clause 1, wherein the instructions are further configured to cause the system to receive, at the one or more processors, an indication of a payment to a balance associated with the customer account information.

Clause 11. The system of Clause 10, wherein: the indication of the payment is received via an electronic transaction from an entity; and the relocation score based on a regionality of the entity.

Clause 12. The system of Clause 10, wherein: the indication of the payment is received via a check; and the instructions are further configured to cause the system to: perform optical character recognition on the check; identify a check address on the check; and update the relocation score based on the check address.

Clause 13. A method for confirming account information, comprising: storing, in a database associated with one or more processors, customer account information including a customer address; receiving, at the one or more processors, transaction data associated with a plurality of customer transactions, the transaction data including transaction location identifiers associated with at least a portion of the plurality of customer transactions; receiving, at the one or more processors and from a geographic location sensor on a user device, device location data associated with the user device; calculating, via the one or more processors, a relocation score based on the device location data and the transaction data; and transmitting, via a transceiver associated with the one or more processors, a notification to the user device seeking confirmation of the account information when the relocation score is above a predetermined value.

Clause 14. The method of Clause 13, wherein the relocation score is based upon at least one of: a quantity of transactions of the plurality of customer transaction having transaction locations beyond a first predetermined distance from the customer address as determined by the transaction location identifiers; or an elapsed duration of time since a customer transaction of the plurality of customer transactions was completed within the first predetermined distance from the customer address.

Clause 15. The method of Clause 13, wherein the relocation score is based upon a duration of time the user device is beyond a first predetermined distance from the customer address.

Clause 16. The method of Clause 13, wherein the relocation score is distance based and the relocation score is adjusted based on a geographic location of at least one of the customer address, transaction locations associated with the transaction location identifiers, or the device location data.

Clause 17. The method of Clause 16, wherein the transaction locations are based on locations of point of sale devices (PoS).

Clause 18. The method of Clause 16, wherein the transaction locations are based on Internet Protocol (IP) addresses associated with digital transactions completed using at least a portion of the customer account information.

Clause 19. The method of Clause 13, wherein the relocation score is further based on a plurality of categories associated with the at least a portion of the plurality of customer transactions, and wherein the plurality of categories is determined based on merchant category codes.

Clause 20. A system for confirming account information, comprising: one or more processors; and memory in communication with the one or more processors and storing instructions that, when executed by the one or more processors, are configured to cause the system to: store, in a database associated with the one or more processors, customer account information including a customer address; calculate, via the one or more processors, a relocation score based on device location data received from a user device and transaction data; receive, at the one or more processors, an indication of a payment to a balance associated with the customer account information, the indication of the payment received via a check; perform, via the one or more processors, optical character recognition on the check to identify a check address; update, via the one or more processors, the relocation score based on the check address; and transmit, via a transceiver associated with the one or more processors, a notification to the user device seeking confirmation of the account information when the relocation score is above a predetermined value.

Exemplary Use Cases

The following exemplary use cases describe examples of a typical user flow pattern. They are intended solely for explanatory purposes and not limitation.

Jim has a credit card account at Company A, and his registered address is 123 Elm Street, Atlanta, Ga. Company A tracks Jim's credit card usage (or receives updates from a third party who tracks Jim's credit card usage) and updates his statement accordingly, and his expenditures are typically within 50 miles of his home address. After 5 weeks, Company A calculates that Jim has used his credit card 20 times outside of a 50 mile radius of his registered address. Since not one of those 20 transactions were within the 50-mile radius, Company A calculates a relocation score that indicates there is a high certainty that Jim has moved. Therefore, Jim may not be receiving his paper bill and Company A may not receive payment for the prior statement(s). Company A therefore sends Jim a push notification via Company A's mobile application asking if his address has changed. Jim selects yes within the mobile application and is prompted to input his new address.

This example fact pattern shows the improvement of the presently described systems over the prior, manual systems of waiting until a customer does not pay a bill for several months before contacting the customer. Instead, Jim received the push notification with only the possibility of one monthly statement being missed.

In the same fact pattern as above, Company A has a tiered system of tracking customer movement. When location information is based solely on transaction location data, as described above for Jim, the maximum relocation score is 50%. Anything under 50% receives some form of automated notification. However, Company A also tracks location data using the Company A mobile application. Over the course of those 5 weeks, Company A also tracks that Jim's mobile device was outside of the 50 mile radius and never re-entered the radius. In view of this, Jim's relocations score increased to over 50% (now 85%) and he receives a call from customer service. This example fact pattern shows the improvement of the presently described systems over the prior, manual as they can selectively calculate which customers deserve a manual phone call from customer service and which accounts can suffice with receiving an automatic notification.

In a final fact pattern for Jim, the 20 credit card transactions outside of the 50-mile radius total over $2000. Company A has a threshold for how much can be spent from an account outside of the predetermined distance from the customer address; Company A sets the threshold at $2000 over any rolling two month period. In view of this, Company A flags Jim as either potentially moving or a case of potential fraud. In this scenario, Company A temporarily deactivates the credit card account and calls Jim directly to inquire about whether his spending and location information are indicative of a potential relocation.

In another fact pattern, Jane has a credit card account at Company B, and her registered address is 647 Main Street, Richmond, Va. Company B tracks Jane's credit card usage and updates her statement accordingly. Typically, Jane sends a check each month from her checking account with Bank Y, which is based in Arlington, Va. and has an East Coast regional footprint. One month, Company B receives a check from Jane to pay for her credit card statement, and Company B identifies that the routing number on the check is from Bank Z, which only has branches in California. Company B calculates a high relocation score based on this information, and immediately (a) places a hold on Jane's billing and (b) calls Jane with a live customer service agent. Jane confirms she has moved, and the customer service agent updates Jane's billing address and removes the hold.

What is claimed is:

1. A system for confirming account information, comprising:

a user mobile device comprising:

a geographic location sensor; and a mobile application in communication with the geographic location sensor, the mobile application tracking device location data associated with the user mobile device obtained via the geographic location sensor; and a backend system in communication with the user mobile device comprising:

one or more processors; and memory in communication with the one or more processors and storing instructions that, when executed by the one or more processors, are configured to cause the system to:

store, in a database associated with the system, customer account information including a customer address;

receive transaction data associated with a plurality of customer transactions, the transaction data including transaction location identifiers associated with at least a portion of the plurality of customer transactions;

receive, from the mobile application, the device location data tracked via the geographic location sensor;

calculate a relocation score based on the transaction data, wherein the relocation score is based upon:

a quantity of transactions of the plurality of customer transactions having transaction locations beyond a first predetermined distance from the customer address as determined by the transaction location identifiers;

an elapsed duration of time since a customer transaction of the plurality of customer transactions was completed within the first predetermined distance from the customer address; and a duration of time the user mobile device is beyond a second predetermined distance from the customer address, as determined by the device location data; and transmit, via a transceiver associated with the system, a notification to the user mobile device seeking confirmation of the account information when the relocation score is above a predetermined value.

2. The system of claim 1, wherein the first predetermined distance and the second predetermined distance are the same distance.

3. The system of claim 1, wherein the second predetermined distance is weighted based upon a geographic location of at least one of the customer address or transaction locations.

4. The system of claim 1, wherein the first predetermined distance is weighted based upon a geographic location of at least one of the customer address or the transaction locations.

5. The system of claim 1, wherein the relocation score is further based on a plurality of categories associated with the at least a portion of the plurality of customer transactions, and wherein the plurality of categories is determined based on merchant category codes.

6. The system of claim 1, wherein the transaction locations are based on locations of point of sale devices (PoS).

7. The system of claim 1, wherein the transaction locations are based on Internet Protocol (IP) addresses associated with digital transactions completed using at least a portion of the customer account information.

8. The system of claim 1, wherein the duration of time is greater than 60 days.

9. The system of claim 1, wherein the instructions are further configured to cause the system to receive, at the one or more processors, an indication of a payment to a balance associated with the customer account information.

10. The system of claim 9, wherein:

the indication of the payment is received via an electronic transaction from an entity; and the relocation score based on a regionality of the entity.

11. The system of claim 9, wherein:

the indication of the payment is received via a check; and the instructions are further configured to cause the system to:

perform optical character recognition on the check;

identify a check address on the check; and update the relocation score based on the check address.

12. The system of claim 1, wherein the instructions are further configured to cause the system to hold billing to the customer address when the relocation score is above the predetermined value, thereby decreasing a chance for fraud.

13. The system of claim 1, wherein the instructions are further configured to cause the system to freeze a customer account associated with the customer account information when the relocation score is above the predetermined value, thereby preventing a purchase using the customer account.

14. A method for confirming account information, comprising:

tracking, via a mobile application in communication with a geographic location sensor on a user mobile device, device location data associated with the user mobile device;

storing, in a database associated with one or more processors of a backend system, customer account information including a customer address;

receiving, at the one or more processors of the backend system, transaction data associated with a plurality of customer transactions, the transaction data including transaction location identifiers associated with at least a portion of the plurality of customer transactions;

receiving, at the one or more processors of the backend system and from the mobile application in communication with the geographic location sensor, the device location data;

calculating, via the one or more processors of the backend system, a relocation score based on the device location data and the transaction data, the relocation score being determined based upon:

a quantity of transactions of the plurality of customer transactions having transaction locations beyond a first predetermined distance from the customer address as determined by the transaction location identifiers;

an elapsed duration of time since a customer transaction of the plurality of customer transactions was completed within the first predetermined distance from the customer address; and a duration of time the user mobile device is beyond the first a second predetermined distance from the customer address, as determined by the device location data; and transmitting, via a transceiver associated with the one or more processors of the backend system, a notification to the user mobile device seeking confirmation of the account information when the relocation score is above a predetermined value.

15. The method of claim 14, wherein the relocation score is location based, and the relocation score is weighted based on a geographic location of at least one of the customer address.

16. The method of claim 15, wherein the transaction locations are based on locations of point of sale devices (PoS).

17. The method of claim 15, wherein the transaction locations are based on Internet Protocol (IP) addresses associated with digital transactions completed using at least a portion of the customer account information.

18. The method of claim 14, wherein the relocation score is further based on a plurality of categories associated with the at least a portion of the plurality of customer transactions, and wherein the plurality of categories is determined based on merchant category codes.

19. The method of claim 14, further comprising holding, via the one or more processors of the backend system, billing to the customer address when the relocation score is above the predetermined value, thereby decreasing a chance for fraud.

20. The method of claim 14, wherein the first predetermined distance and the second predetermined distance are the same distance.

* * * * *